June 18, 1935. M. L. BROWN ET AL 2,004,924
PERMANENT MARKER FOR COTTON BALES
Filed Feb. 7, 1935
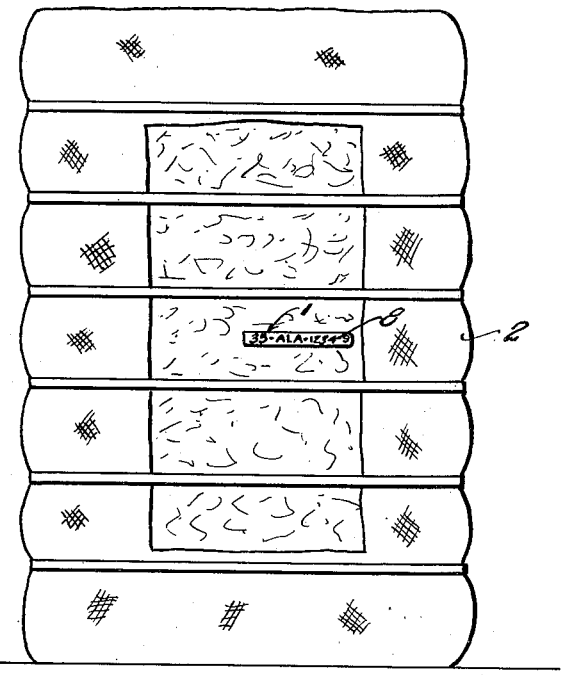
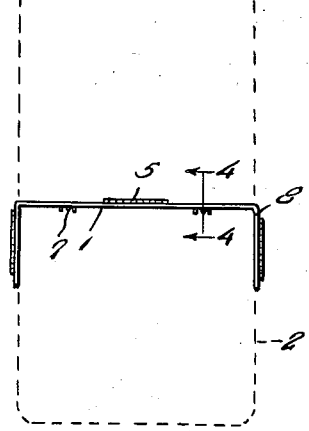
Inventors
Samuel Brown
Milton L. Brown
By Clarence A. O'Brien
Attorney Patented June 18, 1935

2,004,924

UNITED STATES PATENT OFFICE 2,004,924

PERMANENT MARKER FOR COTTON BALES

Milton L. Brown and Samuel Brown, Mobile, Ala.

Application February 7, 1935, Serial No. 5,478

1 Claim. (Cl. 40—20)

This invention relates to a permanent marker for cotton bales and the like, the general object of the invention being to provide a flexible metal band having indicia thereon for identifying the bales, the band extending through the bale with its ends projecting therefrom, with the indicia placed on said projecting ends and at the center of the band so that this centrally arranged indicia will be located inside the bale and thus the bale can be identified even though a fire occurs which would partly destroy the bale.

This invention also consists in certain other features of construction and in the combination and arrangement of several parts, to be hereinafter full described, illustrated in the accompanying drawing and specifically pointed out in the appended claim.

In describing the invention in detail, reference will be had to the accompanying drawing wherein like characters denote like or corresponding parts throughout the several views, and in which:

Fig. 1 is a view of a bale having the invention associated therewith.

Fig. 2 is a face view of the band.

Fig 3 is a view showing how the band is arranged in a bale, the bale being shown in dotted lines.

Fig. 4 is a section on line 4—4 of Fig. 3.

In this drawing, the numeral 1 indicates a band formed of flexible steel and of a length to pass transversely through a bale of cotton or the like, as shown in Figs. 1 and 3, with its ends projecting from the sides of the bale and from those portions which are not covered by the wrapping 2 of the bale. Indicia for identifying the bales is embossed at the center of the band as shown at 3 and at each end thereof as shown at 4 so that when the band is in position in a bale, the central indicia will be located in the bale and the indicia at the ends of the band will be exposed. The embossing of the characters of the indicia in the band will form raised portions 5 on one face of the band and recesses on the other face and these recesses and projections of the central indicia will prevent the band from being pulled out of the bale as they form projections entering the cotton in the bale and recesses for receiving some of the cotton. Holes 6 are punched in intermediate portions of the band and the metal formed by these holes form projections 7 which extend from the opposite face of the band from which the projections 5 extend as shown in Figs. 3 and 4, and these projections 7 also act to prevent the band from being pulled from the bale.

After approximately half of the cotton has been placed in the bale press, the band is placed in position with its ends projecting from the press, and then the remainder of the cotton is placed in the press, and the bale completed in the usual manner. This will place the band in the central part of the bale with its ends projecting from the unwrapped side portions thereof and then the ends are bent downwardly against the bale as shown at 8 in Figs. 1 and 3.

From the foregoing, it will be seen that we have provided an indestructible permanent marker for a bale of cotton or the like and even though one or both ends of the band may be broken off or destroyed, the bale can still be identified by the indicia on the central part of the band which is located within the bale and the band being of steel, it will resist fire so that even though the bale has been damaged by fire, identification is still possible by means of the band.

It is thought from the foregoing description that the advantages and novel features of the invention will be readily apparent.

It is to be understood that changes may be made in the construction and in the combination and arrangement of the several parts, provided that such changes fall within the scope of the appended claim.

We claim:

In combination with a bale of fibrous material, an identification member therefor comprising a metal band extending through the bale with its ends projecting therefrom, said band having identifying indicia thereon arranged at the center and the ends of the band, said indicia being embossed in the band and an intermediate part of the band having holes therein, the metal from which forms projections, said projections extending from that face of the band which is opposite the face having the projections formed by the embossing thereon.

MILTON L. BROWN.
SAMUEL BROWN.